United States Patent [19]

Takasaki et al.

[11] Patent Number: 5,026,266

[45] Date of Patent: Jun. 25, 1991

[54] LABEL FEEDER FOR A MOLD FOR PLASTICS MOLDINGS

[75] Inventors: Chiaki Takasaki; Tatuo Furuse; Morio Amagasaki, all of Tokyo, Japan

[73] Assignees: Toppan Publishing C., Ltd., Tokyo, Japan; Kabushiki Kaisha Tahara, Tokyo, Japan

[21] Appl. No.: 452,736

[22] Filed: Dec. 21, 1989

[30] Foreign Application Priority Data

Dec. 16, 1988 [JP] Japan .............................. 63-328569
Feb. 16, 1989 [JP] Japan .................................. 1-37110

[51] Int. Cl.$^5$ ............................................. B29C 45/80
[52] U.S. Cl. .................................... 425/150; 264/509; 425/503; 425/504; 425/539
[58] Field of Search ................ 264/509; 425/503, 504, 425/539, 150

[56] References Cited

U.S. PATENT DOCUMENTS

4,585,408  4/1986  Darr ..................................... 425/503
4,840,366  6/1989  Johnston et al. ..................... 425/504

Primary Examiner—Timothy Heitbrink
Attorney, Agent, or Firm—Browdy and Neimark

[57] ABSTRACT

The invention relates to an apparatus for feeding labels to a mold for plastic parts. An object of the invention is to having a pair of tie bars associated therewith for opening and closing the mold, can feed into the mold cavity labels larger than conventional labels, can also feed labels to various molds having different sizes and different heights, and which is also arranged such that the label-attachment locations and the position of labels relative to a mold can be changed when the labels are attached. To achieve this object, the label feeder has a base frame whose height is adjustable relative to the floor on which it is mounted, a generally rod-shaped loader swingably mounted on the base frame, a longitudinally expandable expansion element adjustably mounted on the loader, on arm mechanism mounted on the front end of the expansion element and having a front end structure which can be laterally opened and closed, a label sucking device attached to the front end of the arm mechanism, and a parallel linkage connecting device for feeding the labels in a parallel manner with respect to parting surfaces of the mold when the arm mechanism is laterally opened and closed.

3 Claims, 11 Drawing Sheets

LABEL FEEDER FOR A MOLD FOR PLASTICS MOLDINGS

BACKGROUND OF THE INVENTION

1. Field of the Invention

The present invention relates to an apparatus for feeding a plastics molding machine with labels to be attached to the surface of a molding within the molding machine, and also to a method of producing plastics moldings.

2. Description of the Prior Art

An U.S. patent application Ser. No. 85/722,317 filed Apr. 11, 1985 and, entitled "Intra-mold Label Dispenser", discloses an invention which relates to a label feeding apparatus for feeding labels to walls of a mold cavity for forming plastics. This application issued as U.S. Pat. No. 4,585,408 on Apr. 29, 1986. A corresponding Japanese application Sho. No. 61-83198 was filed Apr. 10, 1986 with a declaration of priority at the Japanese Patent Office, and was laid open to public inspection on Oct. 22, 1986 under the number 61-237,620.

The "intra-mold label dispenser" comprises:

a base located near a mold and provided with label magazines for storing labels therein;

a sub-base movably mounted on the base so as to be reciprocatable between opened mold parts;

a first actuator provided on said base for reciprocating the sub-base;

a shuttle movably provided on said sub-base so as to be movable toward and away from said mold;

a second actuator provided on said sub-base for actuating the shuttle;

a label carrier fixed to said shuttle such that it can take labels out of said magazines; and a controller for operating said first and second actuators, said controller having: a label conveying step in which said shuttle is moved toward said label magazine, labels are taken out of said label magazines by said label carrier, and said second actuator is driven to move said shuttle to a position in which the labels can be inserted into the mold in the opened state; a label setting step in which said sub-base is moved by said first actuator to transfer the labels from said label carrier to one of the mold; and a return step in which said sub-base is returned to its original position for the next cycle.

In the "intra-mold label dispenser", labels are positioned at label-attachment portions of the mold by causing the second actuator to move the label carrier to the proximity of the label attachment portions when the sub-base is positioned in the gap between the opened mold parts.

When the prior art intra-mold label dispenser is used to feed labels to a mold which is opened and closed along at least one pair of tie bars, the label carrier with labels thereon must be passed between the tie bars of the pair so as to place the labels in proper positions relative to the mold cavity walls after the mold has been opened.

In this prior art label dispenser, however, the sub-base or the shuttle cannot be adjusted with respect to their height or angular position relative to a horizontal plane, and the presence of the tie bars hinders the advance of the label carrier to the cavity walls. Therefore, there is a problem in that the label carrier and the labels must be made smaller when the label dispenser should be used with a mold associated with a pair of tie bars. The prior art label dispenser has another problem in that, when the label dispenser is used for various types of molds having different heights, the locations where the labels are to be attached, or the position of the labels placed in such locations relative to the molds, cannot be changed.

SUMMARY OF THE INVENTION

The present invention was made in view of these problems of the prior art label dispenser or feeder.

A first object of the present invention is therefore to provide a label feeder which can be used with a mold of the type having a pair of tie bars associated therewith for opening and closing the mold, the label feeder being arranged to feed relatively large labels to the intended portions of the mold so as to attach the labels to a molding.

A second object of the present invention is to provide a label feeder which can feed labels to molds of different heights.

A third object of the present invention is to provide a label feeder in which the label-attachment locations and the position of labels relative to a mold can be changed when the labels are to be attached.

To achieve these objects, the label feeder for use with a plastics molding machine according to the invention comprises:

a base frame located laterally to the plastics molding machine in a manner such that the height of the base frame can be adjusted;

at least one label magazine mounted on the base frame for storing therein a pile of labels to be attached to the surface of a molding in a manner such that a predetermined number of labels can be taken out from the pile of the labels;

a loader mounted on said base frame, said loader having an elongated profile extending toward said plastics molding machine and being adjustable with respect to its inclination relative to the horizontal;

expansion means mounted on the loader so as to be movable in the longitudinal direction of the loader;

an arm mechanism having label sucking means and mounted on the expansion means for moving the label sucking means toward and away from said label magazine when said expansion means is in a withdrawn position near said label magazine and for moving the label sucking means toward and away from the region for attachment of a label when said expansion means has been stretched toward said plastics molding machine; and a linkage provided between said expansion means and said label sucking means for maintaining the labels sucked on said label sucking means at constant angles when said label sucking means approaches said label-attachment region.

In a first form of the label feeder, said base frame is provided with an elevator for arbitrarily changing the height of the base frame from the floor on which the base frame is placed, and inclination adjusting means for adjusting the inclination of said loader.

In a second form of the label feeder, said expansion means consists of an air cylinder;

said arm mechanism comprises: a holder attached to a front end of said air cylinder; a guide shaft extending from the holder in the longitudinal direction of said air cylinder and having a stop plate provided at a front end thereof; a slider block slidably guided along the guide shaft; a first link arm pivoted at its proximal end to the slider block and having a length, from its proximal end to its free end, corresponding to the length of the region of movement of the slider block; a second link arm pivoted at its proximal end to said stop plate and rotatably connected at its free end to an intermediate portion of said first link arm; and a second air cylinder for moving said slider block toward and away from said holder, said linkage is a parallel linkage consisting of: said first link arm; said slider block; a third link arm rotatably pivoted at one end to said slider block and having a length corresponding to said first link arm; and a fourth link arm pivoted at one end to said stop plate and further pivoted at the other end to the other end of said third link arm, said linkage being arranged such that the labels sucked on said label sucking means are moved in a parallel relation relative to a vertical plane when said slider block is moved.

said label sucking means is attached to said fourth link arm.

In a third form of the label feeder, a controller is provided which has:

a label taking out step in which the drive of said expansion means, said arm mechanism and said label sucking means is controlled such that, when said mold is closed, said expansion means is contracted so as to position said label sucking means on one side of said label magazine, said arm mechanism being subsequently stretched so as to make said label sucking means abut against the label so that the label is drawn to said label sucking means by drawing air through said sucking means, said arm mechanism being then again contracted;

a label attaching step in which, when the pair of mold parts constituting the mold is opened and their cavity walls are located opposite to each other, said expansion means is stretched so as to make said label sucking means face said label-attachment region, said arm mechanism being then stretched so as to attach the label carried on said label sucking means to said label-attachment region; and a standby step in which, after the label has been attached to said label-attachment region, both of said arm mechanism and said expansion means are contracted and said label sucking means is positioned on the side of said label magazine until said mold is again opened.

In another aspect, the present invention provides a method of producing plastics moldings using the above-mentioned label feeder for attaching at least one label to each molding, the method comprising the steps of: directing the front end of said loader to facing regions of the opened mold parts; contracting said expansion means so as to take a label out of said label magazine by means of said label sucking means when the mold parts are faced together; stretching said expansion means so as to make the sucked label on said label sucking means face the label-attachment region of said mold; contracting said arm mechanism and said expansion means; making said arm mechanism and said expansion means stay in their contracted positions until the next molding cycle; closing the mold; feeding plastics into said mold cavity; and attaching another label to the surface of the thus formed molding.

The present invention also provides another method of producing plastics moldings using the above-mentioned label feeder for attaching at least one label to each molding, a blow mold being used as said mold, said blow mold being reciprocatable between a compressed-air supply nozzle and a parison extruder, the method comprising the steps of: directing said loader toward the parison extruder; taking a label out of said label magazine by means of said label sucking means before or during the extrusion of a parison by the parison extruder; stretching said expansion means so as to attach the sucked label on the label sucking means to the inside of said mold just before a parison sufficient to form a complete molding is extruded from the parison extruder; moving, after a parison sufficient to form a complete molding has been extruded from said parison extruder, the parts of the blow mold, with the label attached thereto, toward the side of the parison so as to close the mold; moving said blow mold away from said parison extruder; and supplying compressed air into said parison through said nozzle so as to form a molding.

BRIEF DESCRIPTION OF THE DRAWINGS

Embodiments of the label feeder for use with a plastics molding machine and the method of producing plastics moldings using such label feeder will be described with reference to the accompanying drawings, in which.

DESCRIPTION OF THE PREFERRED EMBODIMENTS

Figure 1:
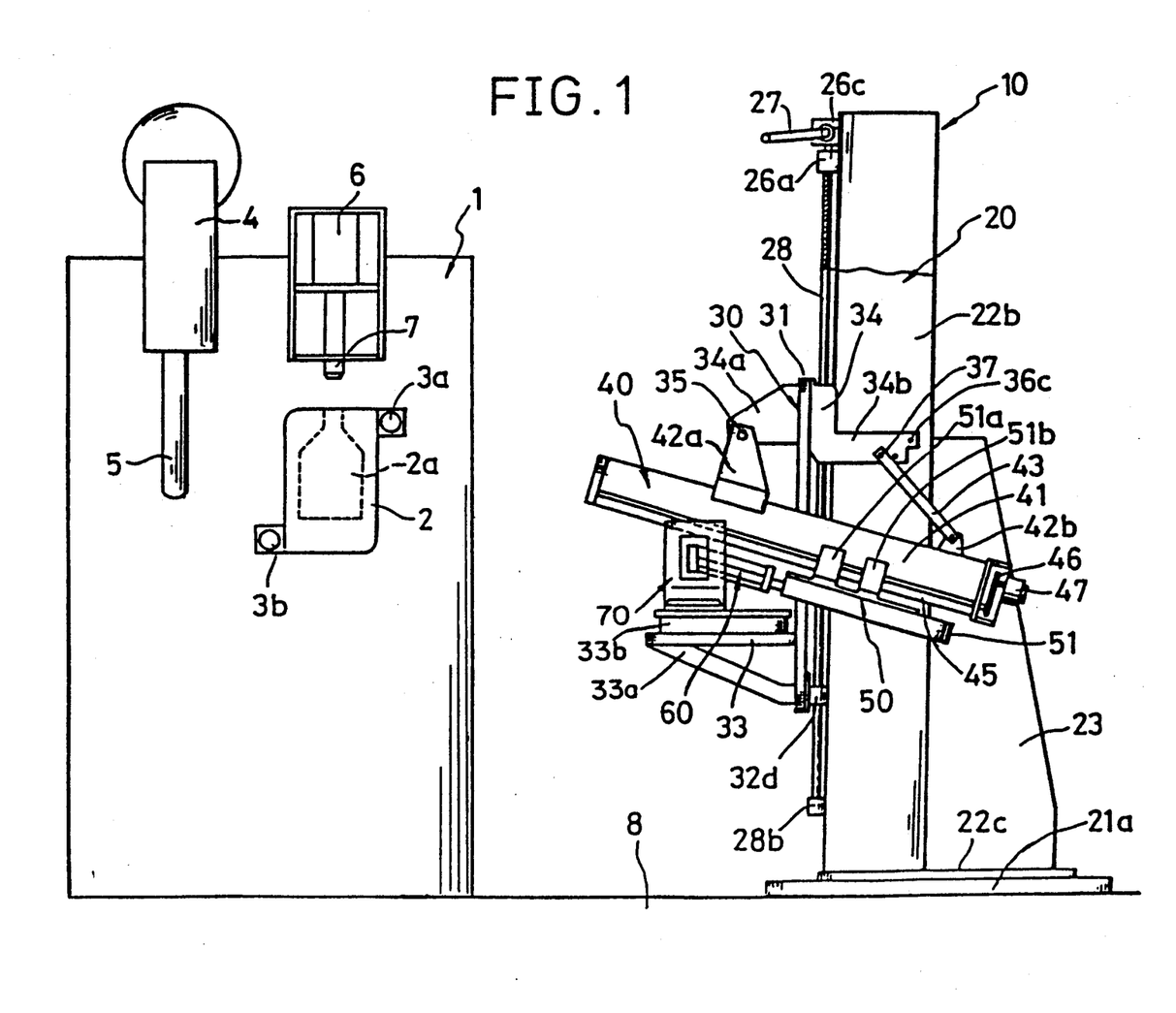
FIG. 1 is an illustration for explaining the overall arrangement of a first embodiment of the label feeder according to the present invention.

Reference numeral 1 designates a molding machine. 2 designates a blow mold comprising mold parts having walls 2a defining a cavity within the mold. The parts constituting the blow mold 2 are guided by a pair of tie bars 3a and 3b so that they can move toward and away from each other. An extruder 4 for extruding a parison 5 is placed near the blow mold 2. The position of the mold 2 is adjustable relative to the parison 5. An air compressor 6 having an air nozzle 7 extending downward for supplying compressed air is provided over the cavity defining walls 2a of the mold 2.

A label feeder 10 is placed laterally to the blow-molding machine 1. The label feeder 10 will feed labels to the surface of a molding when the mold 2 is opened.

Figure 2:
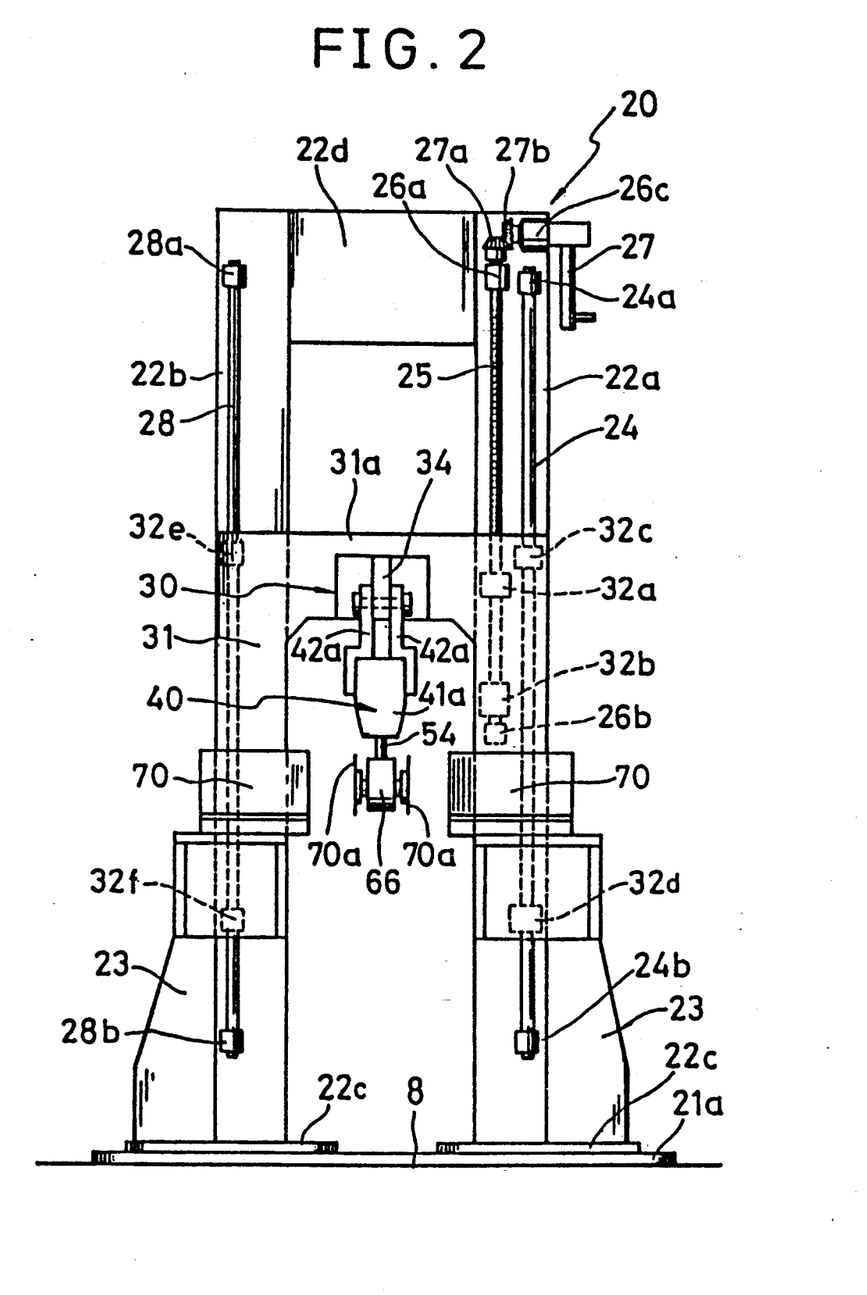
FIG. 2 is a schematic front view of a frame and base frame shown in FIG. 1.
Figure 3:
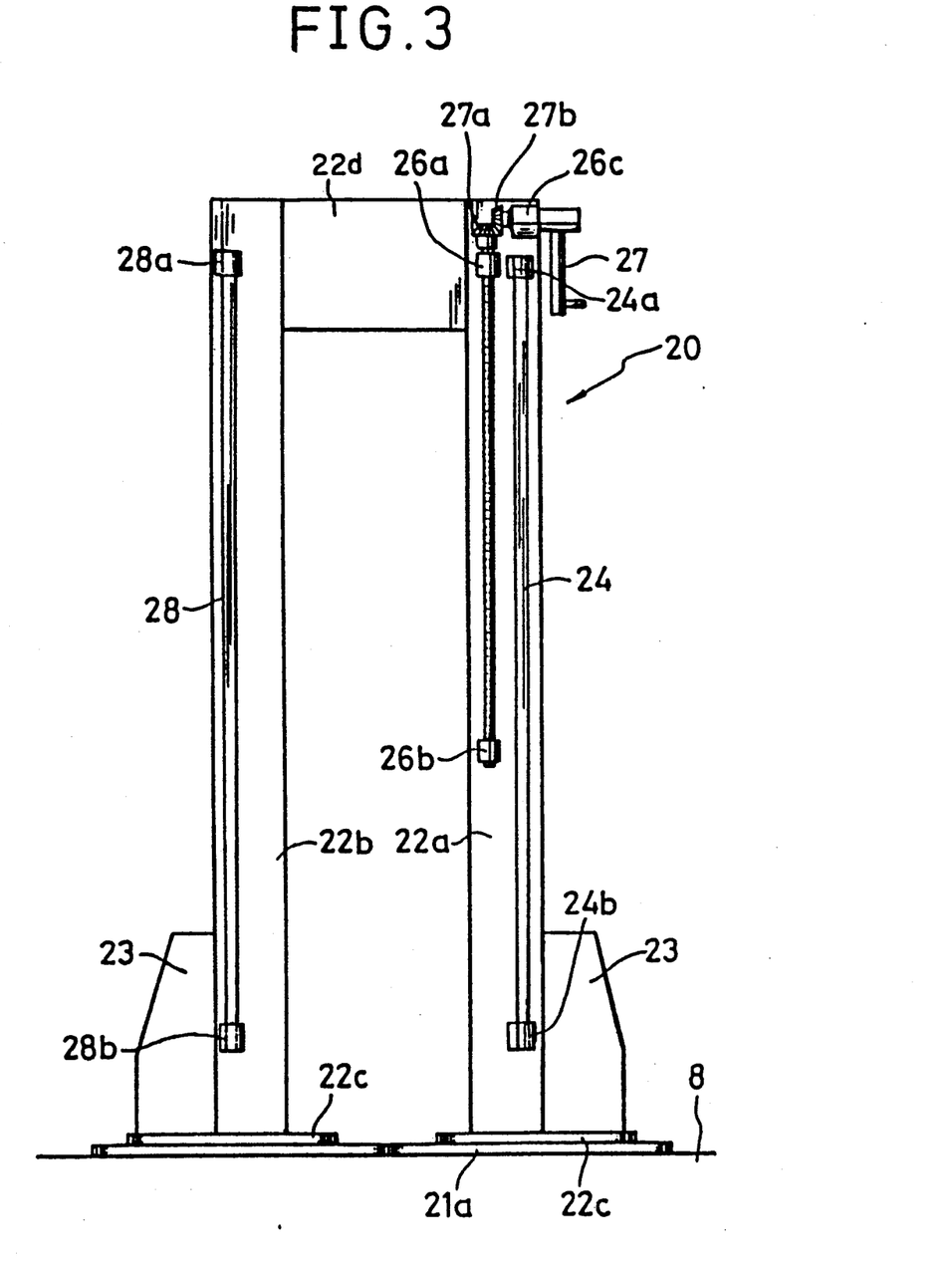
FIG. 3 is a schematic front view showing the frame of FIG. 1.

The label feeder 10 has a suspension 20 standing upward from a floor 8. The suspension 20 is provided with a base plate 21a associated with lockable wheels (not shown) for movement on the floor 8. A pair of frames 22a and 22b stands on the base plate 21a. The provision of the pair of frames 22a and 22b defines a region for swinging of a loader 40, and allows the loader 40 to be adjustable with respect to its height within a wide range. The tops of the frames 22a and 22b are fastened together by a support plate 22d extending in a vertical plane, while the frames 22a and 22b have flanges 22c, 22c formed at the lower ends thereof and fastened to the base plate 21a. Brace brackets 23 support the frames 22a and 22b and are fastened to the frames 22a and 22b and to the fastening flanges 22c. One of the frames 22a and 22b of the pair is provided with a guide shaft 24 and a screw rod 25, both of which extend vertically. The guide shaft 24 is fixed at upper and lower portions thereof by holders 24a, 24b which are in turn fixed to the fram 22a such that the guide shaft 24 cannot rotate. The screw rod 25 is held at upper and lower portions thereof by holders 26a and 26b such that the rod 25 can neither rotate nor move vertically. A bevel gear 27a is secured to the upper end of the screw rod 25 and engages with another bevel gear 27b on the upper end of the frame 22a. The bevel gear 27b is rotatably held by a holder 26c attached to the upper end of the frame 22a and can be rotated by means of a handle 27 mounted on the holder 26c. The screw rod 25 is in threaded engagement with the base frame 30. On the frame 22b, there is provided a guide shaft 28 held by holders 28a and 28b such that the shaft 28 cannot move vertically.

Figure 4:
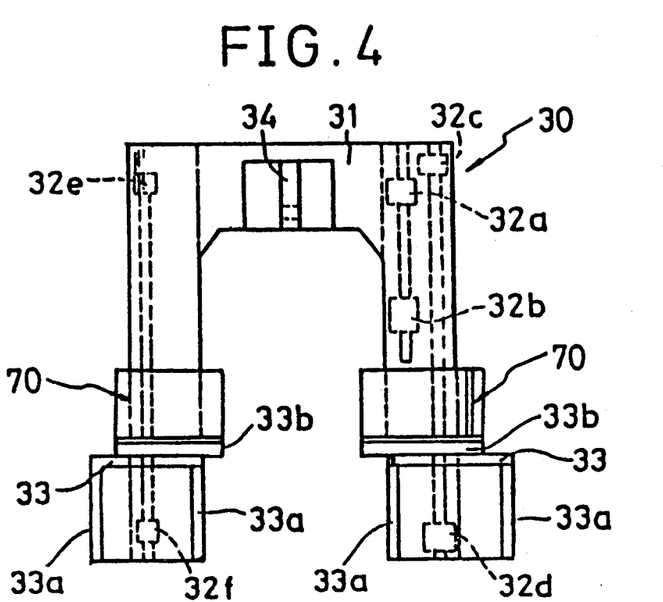
FIG. 4 is a schematic front view showing the base frame of FIG. 1.
Figure 5:
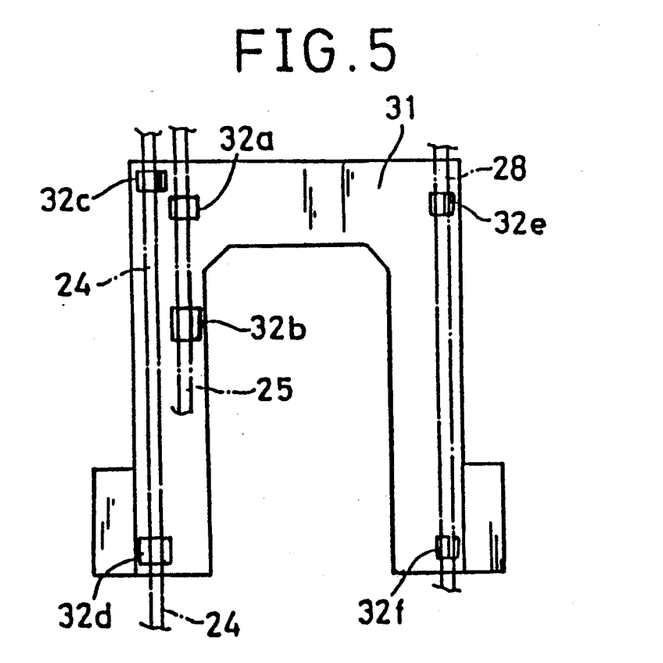
FIG. 5 is a rear view showing the base frame of FIG. 1.

The base frame 30 supports the loader 40 and label magazines 70. As shown in FIGS. 1 and 5, the base frame 30 is provided with a base plate 31, screw guides 32a and 32b, tables 33, and a bracket 34. In this embodiment, the base plate 31 has the form of an inverted "U" so that it can be moved vertically along the frames 22a and 22b while being held by the screw rod 25, with screw guides 32a and 32b and slide guides 32c, 32d, 32e and 32f being provided on the sides of the base plate located opposite to the frames 22a and 22b. The screw guides 32a and 32b are in threaded engagement with the screw rod 25. The slide guides 32c and 32d are slidably fitted on the guide shaft 24, while the slide guides 32e and 32f are slidably fitted on the guide shaft 28. The tables 33, on which the label magazines are mounted, are attached to the lower ends of the base plate 31. The tables 33 are supported on brace stays 33a fastened to the base plate 31. Pedestals 33b for mounting the label magazines 70 thereon are secured to the tables 33. The bracket 34 extends from an upper portion of the base plate 31 for suspending the loader 40. The bracket 34 comprises a front bracket 34a for holding a front portion of the loader 40, and a rear bracket 34b for holding a rear portion of the loader 40, and the front and rear brackets 34a and 34b have flanges 34c and 34d, respectively, for grasping a central vertical wall portion 31a of the base plate 31 between them. The flanges 34c and 34d and the central vertical wall portion 31a are fastened together by bolts 34e and nuts 34f.

Figure 6:
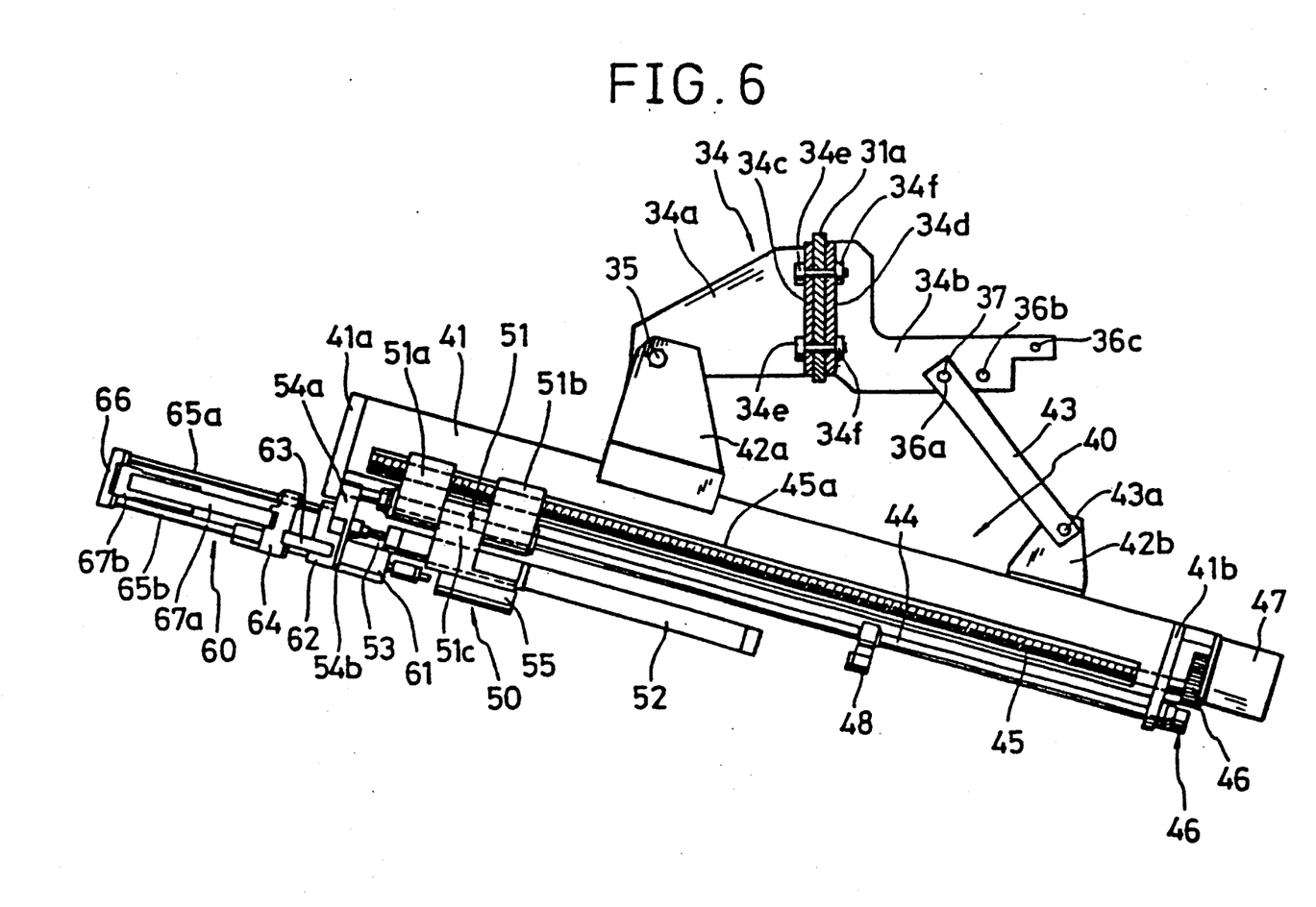
FIG. 6 is a side view showing a loader and an arm mechanism of FIG. 1.

The loader 40 is provided with a main frame 41, a ball/screw rod 45, a gear mechanism 46, and a stepper motor 47, as shown in FIG. 6. Brackets 42a project from a front portion of the main frame 41 and are fastened to the bracket 34a by a fixing pin 35. Other brackets 42b projects from a rear portion of the main frame 41 and are fastened to the bracket 34b by a removable rod 43. The upper end of the rod 43 is secured to the bracket by a fixing pin 37. The fixing pin 37 is removably threaded into a positioning threaded hole 36a formed through the bracket 34b. The brackets 34b is provided with a plurality of positioning holes 36a, 36b and 36c for adjusting the inclination of the rod 43. A fixing pin 43a is rotatably inserted into a hole formed through the lower end portion of the rod 43 and is removably fastened to the bracket 42b. The front end of the main frame 41 is directed toward a region in space in which the blow mold 2 is movable when it is opened. In this embodiment of the label feeder 10, the front end of the main frame 41 is directed toward a place located midway between the parts of the mold 2 in the opened state for feeding one label to the cavity defining wall 2a of each mold part. While the rod 43 used in this embodiment has a fixed length, rods having different lengths may be used to adjust the inclination of the main frame 41. Further, a hydraulic cylinder (not shown) may be mounted on the bracket 34b or otherwise appropriately on frames 22a, 22b, or 22d in place of the rod 43, so that the inclination of the main frame 41 can be adjusted by means of the hydraulic cylinder. The main frame 41 has a slot 45a formed therein and extending in the longitudinal direction of the main frame 41, with the ball/screw rod 45 being mounted in the slot 45a for advancing and withdrawing a slide holder 51 toward and away from a place between the mold parts 2. The slide holder 51 serves an air cylinder 52 acting as expansion means. A gear mechanism 46 is provided on the end of the ball/screw rod 45 adjacent to a stop plate 41b, and is driven by a stepper motor 47 secured to the stop plate 41b. The stepper motor 47 is rotated in one direction or in the opposite direction by a specified number of rotations under the control of a power supply (not shown). Another stop plate 41a is provided on one end of the main frame 41 directed to the mold 2, while the above-mentioned stop plate 41b is attached to the opposite end of the main frame 41 remote from the mold 2. A guide rod 44 for supporting the slide holder 51 extends in the longitudinal direction of the main frame 41 between these stop plates 41a and 41b. A stop 48 is provided on the guide rod 44 for limiting the range of movement of the slide holder 51.

A limit switch (not shown) may be provided which is arranged to touch the slide holder 51 at its limit of movement for generating a detection signal to control the stepper motor 47.

50 is a label feeder body, which comprises the slide holder 51, the air cylinder 52 and a rod 53. The slide holder 51 has nut portions 51a and 51b which, together with the ball/screw rod 45, constitute a ball/screw mechanism, and a holder block 51c which is connected to the nut portions 51a and 51b. The holder block 51c holds the air cylinder 52. An evacuator 55 is attached to the lower end of the holder block 51c for expanding and contracting the air cylinder 52. The air cylinder 52 is provided with a rod 53 opposite to the stop plate 41a for moving a slider block 54a following the expansion and contraction of the air cylinder 52. The rod 53 extends from the air cylinder 52 and is stretched out and withdrawn by the action of the air cylinder 52. The slider block 54a slidably holds the guide rod 44. The slider block 54a has a flange 54b projecting below the main frame 41. The previously mentioned rod 53 together with a device 61 for opening and closing an arm mechanism 60 are attached to the flange 54b. The movement of the rod caused by the air cylinder 52 is transmitted to the slider block 54a, which in turn moves in the longitudinal direction of the main frame 41 while being guided by the guide rod 44.

Alternatively, the reciprocation of the holder block 51c may be caused by a hydraulic device (not shown).

Figure 7:
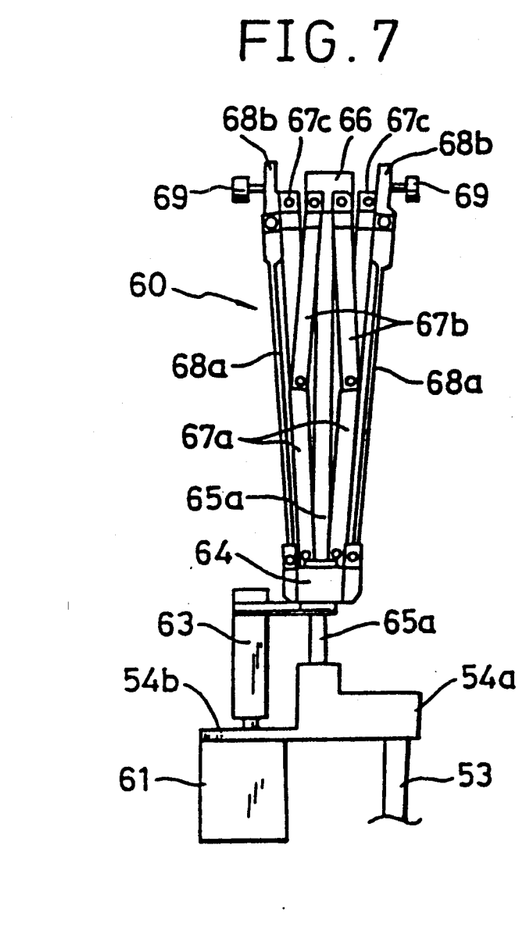
FIG. 7 is a plan view showing the arm mechanism of FIG. 6.

As shown in FIGS. 6 and 7, the arm mechanism 6b is associated with the above-mentioned opening and closing device 61, and comprises a holder 62 joined to the flange 54b, an air cylinder 63, a slider block 64, guide shafts 65a and 65b, a stop plate 66, link arms 67a and 67b.

The guide shafts 65a and 65b are mounted parallel to each other between the holder 62 and the stop plate 66. The slider block 64 is slidably mounted on the guide shafts 65a and 65b. The air cylinder 63 is provided between the slider block 64 and the holder 62 for driving the slider block 64 forward and backward along the guide shafts 65a and 65b. The link arms 67a are rotatably pivoted at their one ends to the slider block 64. The link arms 67b are rotatably pivoted at their one ends to the stop plate 66. The link arms 67a are twice as long as the link arms 67b. The other ends of the link arms 67b are rotatably pivoted to centers of corresponding ones of the link arms 67a. The other ends 67c of the longer link arms 67a will thus move away from each other and from the guide shafts 65a and 65b as the slider block 64 is moved toward the stop plate 66. These ends 67c of the longer link arms 67a will move in a direction perpendicular to the guide shafts 65a and 65b. One ends of link arms 68a, which constitute a parallel linkage, are pivoted at their one ends to the portion of the slider block 64 which is located outside the link arms 67a. The parallel linkage is constituted by these link arms 68a and 67a, the slider block 64, and elbow arms 68b. The link arms 68a and 67a are slightly spaced apart so that they can form a parallelogram. The substantially L-shaped elbow arms 68b are rotatably provided on the other ends of the link arms 67a, while the other ends of link arms 68a are rotatably pivoted to the elbow arms 68b. The elbow arms 68b have pads 69 provided thereon, which will suck air when the link arms 68a are opened and closed. The suction of air by the pads 69 is as follows.

Figure 8:
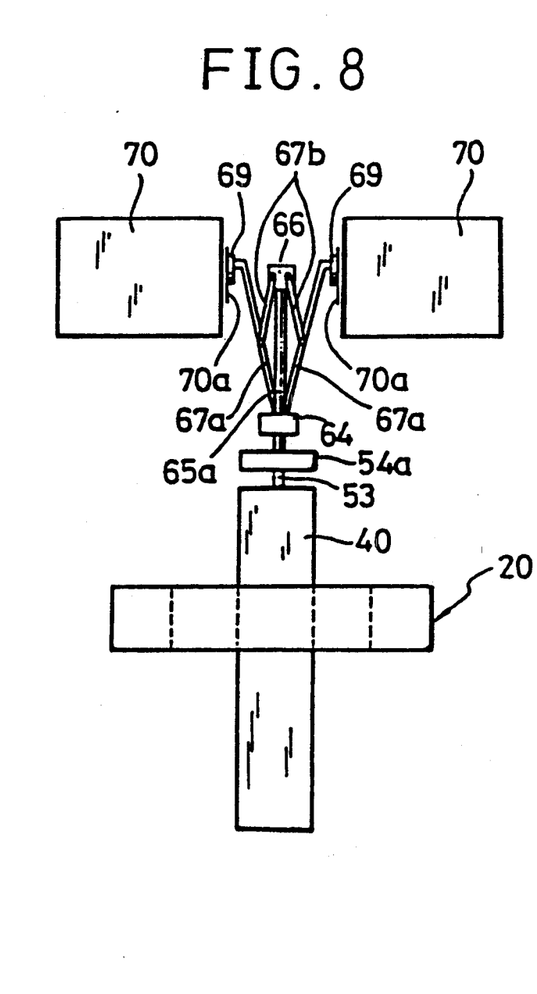
FIG. 8 is an illustration showing the arm mechanism of FIG. 7 positioned between label magazines.

When the air cylinders 52 and 63 are in their contracted positions and the pads 69 are in a position facing the labels 70a in the label magazines 70 (see FIG. 8), suction of air is initiated. The suction of air by the pads 69 is maintained until after the completion of the steps of: stretching out the air cylinder 63 so as to have the pads 69 closely touch the labels in the label magazines 70; contracting the air cylinder 63 so as to take labels 70a out of the magazines 70; stretching out the air cylinder 52 so as to shift the pads 69 to a place between the opened or separated parts of the mold 2 (see FIG. 9); and again stretching out the air cylinder 63 so that the taken out labels 70a will be pushed against the cavity defining walls 2a of the mold. After the labels 70a have been pushed against the cavity walls 2a, suction of air by the pad 68 is terminated, but suction of air is initiated on the cavity walls 2a for drawing the labels onto the walls 2a.

Figure 10:
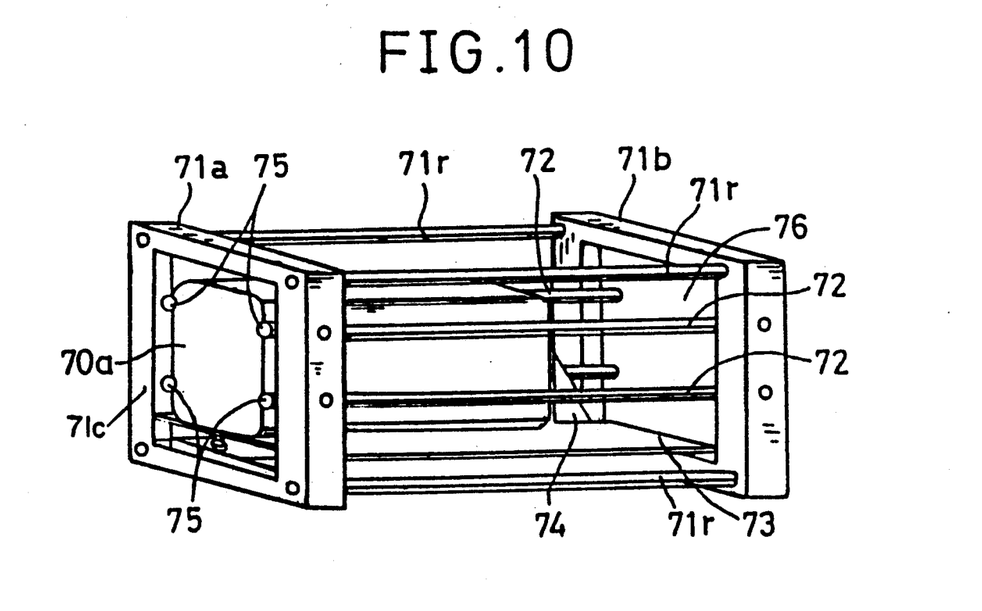
FIG. 10 is a perspective view showing one of the label magazines.

Each of the label magazines 70 for storing a pile of labels 70a therein is provided with a pair of frames 71a and 71b, rods 71r supporting these frames 71a and 71b, label guides 72 provided between the frames 71a and 71b, a base plate 73 for mounting the labels 70a thereon, and a pressure plate 74 for pressing the pile of labels 70a outward toward the frames 71a as shown in FIG. 10. A label output opening 71c is provided in the frame 71a, with click balls 75 being arranged on the walls of the label output opening 71c for allowing one label to pass through the opening 71c at a time. The other frame 71b is closed by a vertical plate 76. This vertical plate 76 can be removed from the frame 71b. A pile of labels 70a can be placed on the base plate 73 when both of the vertical plate 76 and the pressure plate 74 have been removed. The label magazines 70 are arranged on the tables 33 such that they can be adjusted with respect to their height. The magazines 70 can be removed from the table 33 so that they can be substituted by other magazines which contain different labels therein, and naturally their position on the tables 33 can be adjusted.

The labels 70a are transferred from the magazines 70 to the cavity defining walls 2a without changing their postures relative to the walls 2a. To make it possible to adjust the postures of the labels 70a relative to the mold 2 when they are placed on the cavity walls 2a, means may be provided for allowing the label magazines 70 to be inclined about an axis extending in the longitudinal direction of the label guides 72 so as to modify the postures of the labels 70a when they are sucked on the pads.

The operation of the embodiment of the label feeder 10 will now be described. The arrangement of a controller for controlling the operation of the stepper motor 47, and the air cylinders 52 and 63, for controlling the suction of air by the pad 69, and for controlling the opening or closing of the mold 2, will be described in conjunction with the operation of the label feeder 10.

The label feeder 10 is operated in an interlocked manner with the plastics molding machine 1.

Firstly, the loader 40 is placed midway between the cavity defining walls 2a of the separated mold parts so that labels 70a can be transferred to the two cavity walls 2a facing together. The frame structure 22 is set so that the pads 69 can transfer the labels 70a to proper regions of the cavity defining walls 2a when the air cylinders 52 and 63 have been fully stretched. The label magazines 70 are set so that they will be placed opposite to the pads 69 when the air cylinders 52 and 63 are contracted, and the pads 69 will touch the labels 70a when one air cylinder 52 is in its contracted position but the other one 63 is stretched out. The length of the rod 43 of the loader 40 is selected in conjunction of the selection of the positioning holes 36a, 36b and 36c so that the main frame 41 will not touch the tie bars 3a and 3b associated with the mold 2. Where a hydraulic cylinder is used, the length of the hydraulic cylinder is adjusted.

Figure 9:
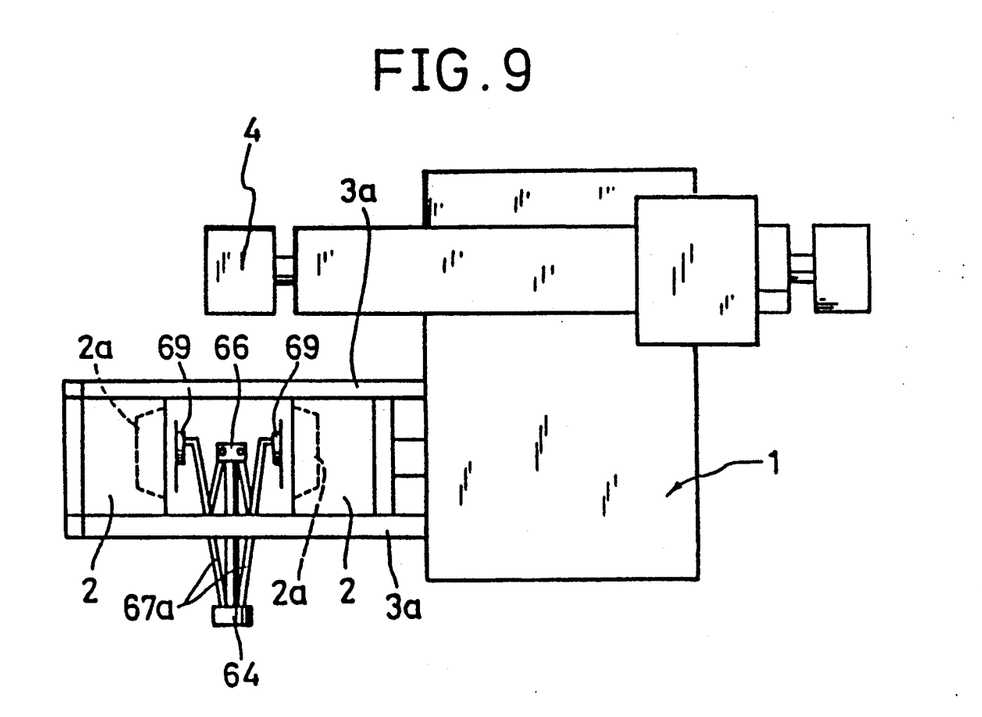
FIG. 9 is an illustration showing the arm mechanism of FIG. 6 positioned between opened mold parts.

After the label feeder 10 has been properly set up and adjusted, labels 70a are stored in the label magazines 70. Bothe air cylinders 52 and 63 are contracted. When the parison extruder 4 begins extrusion of a parison 5, the mold 2 is opened. Subsequently, suction of air by the pads 69 is initiated. The air cylinder 63 is then stretched out to have the pads 69 closely touch labels 70a stored in the magazines 70. After the pads 69 have drawn labels 70a thereto, the air cylinder 63 is contracted to move the pads 69 toward the guide shafts 65a. When the air cylinder 63 has been contracted, the other air cylinder 52 is stretched out to pass the pads 69 between the tie bars 3a so that the labels 70a can be placed opposite to the cavity defining walls 2a, as shown in FIG. 9. Subsequently, the air cylinder 63 is stretched to move the pads 69 toward the cavity defining walls 2a. The labels 70a are then moved without changing their postures relative to the cavity defining walls 2a because the link arms 67a and 68a, holder 64 and elbow arms 68b form a parallel linkage. The presence of this parallel linkage allows labels 70a of largest size to be transferred to the cavity defining walls 2a because, without the link arms 68a and elbow arms 68b forming the parallel linkage, the pads 69 will be moved along arcuate paths and consequently large labels 70a can touch edges of the cavity defining walls 2a. After the labels 70a have been pressed against the cavity walls 2a, suction of air by the pads 69 is terminated but the labels 70a are then drawn to the walls 2a by suction effected by suitable means not shown. After the labels 70a have been fully drawn onto the walls 2a, the air cylinders 63 and 52 will be contracted to place the pads 69 opposite to the label magazines 70 for the next label feeding cycle.

When the labels 70a have been drawn onto the cavity defining walls 2a, the parts of the mold 2 are moved to opposite sides of the parison 5. After a sufficient volume of the parison 5 to form a molding has been extruded, the mold parts are closed together to confine the parison 5 within the cavity. Extrusion of a parison by the extruder 4 is then discontinued until the initiation of the next molding operation. The mold 2 containing the parison 5 is returned to the place under the air nozzle. The air nozzle 7 is then inserted into the parison 5 and compressed air is supplied from the air compressor 6 into the parison through the nozzle 7. The parison 5 will be inflated thereby within the cavity to form a molding. The labels 70a are then thermally adhered to predetermined portions of the molding. The drawing of the labels 70a onto the cavity defining walls 2a will be continued until the parison 5 are fully inflated. The drawing of the labels 70a is terminated when the parison 5 has been fully inflated within the cavity and the labels 70a have been attached to the surface of the parison 5. After the formed molding has been cooled, the mold 2 is opened so that the molding with the labels 70a attached will fall. A conveying device such as a belt conveyer may be provided under the mold 2. After the mold 2 has been opened, operation of the extruder 4 is again initiated to extrude the next parison 5 for forming the next molding and simultaneously the air cylinder 63 is stretched out for feeding the next labels 70a.

The controller will control the drive of the air sucking means associated with the pads 69 as well as the drive of the air cylinders 63 and 52, so that the label feeder 10 can be operated in conjunction with the operation of the parison extruder 4, the mold 2, the air compressor 6 and the driver for driving the air nozzole 7 in vertical directions. This controller has a label taking out step, a label attaching step and a standby step.

In the label taking out step, when the mold 2 is closed, the air cylinders 52 and 63 are contracted to place the pads 69 on the sides of the label magazines 70, the air cylinder 63 being subsequently stretched out to have the pads 69 touch the labels 70a, air being drawn through the pads 69 to draw the labels 70a onto the pads, said arm mechanism being then again contracted.

In the label attaching step, when the pair of mold parts constituting the mold 2 is opened and their cavity defining walls 2a are located opposite to each other, the air cylinder 52 is stretched so as to have the pads 69 face the cavity defining walls 2a, the air cylinder 63 being then stretched so as to attach the labels 70a carried on the pads 69 to the cavity defining walls 2a.

In the standby step, after the labels 70a have been attached to the cavity defining walls 2a, both of the air cylinders 52 and 63 are contracted and the pads 69 are positioned on the sides of said label magazine until the mold 2 is again opened.

A second embodiment 20 of the label feeder according to the present invention will now be described.

Figure 11:
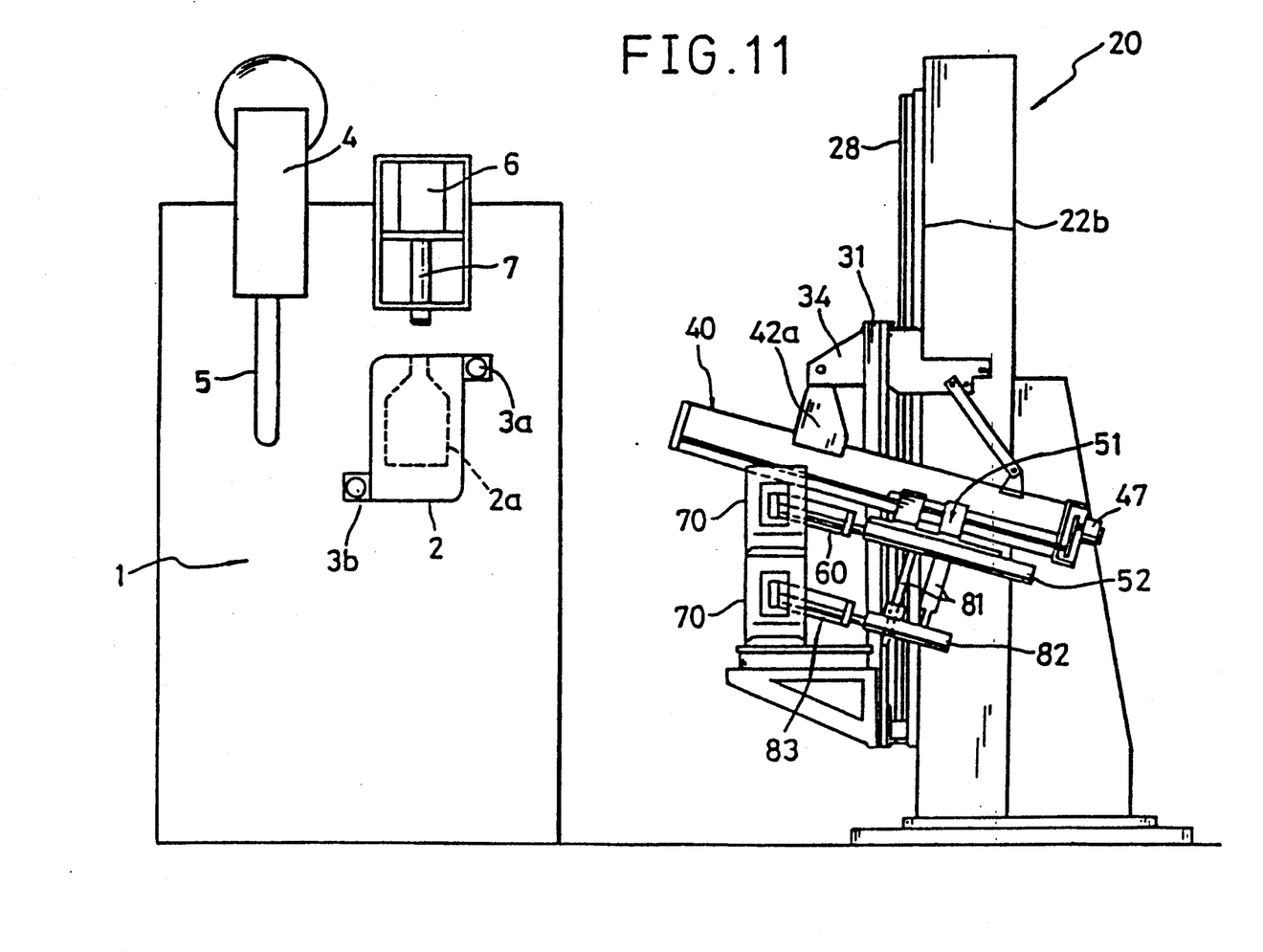
FIG. 11 is an illustration showing a second embodiment of the label feeder and a plastics molding machine.
Figure 12:
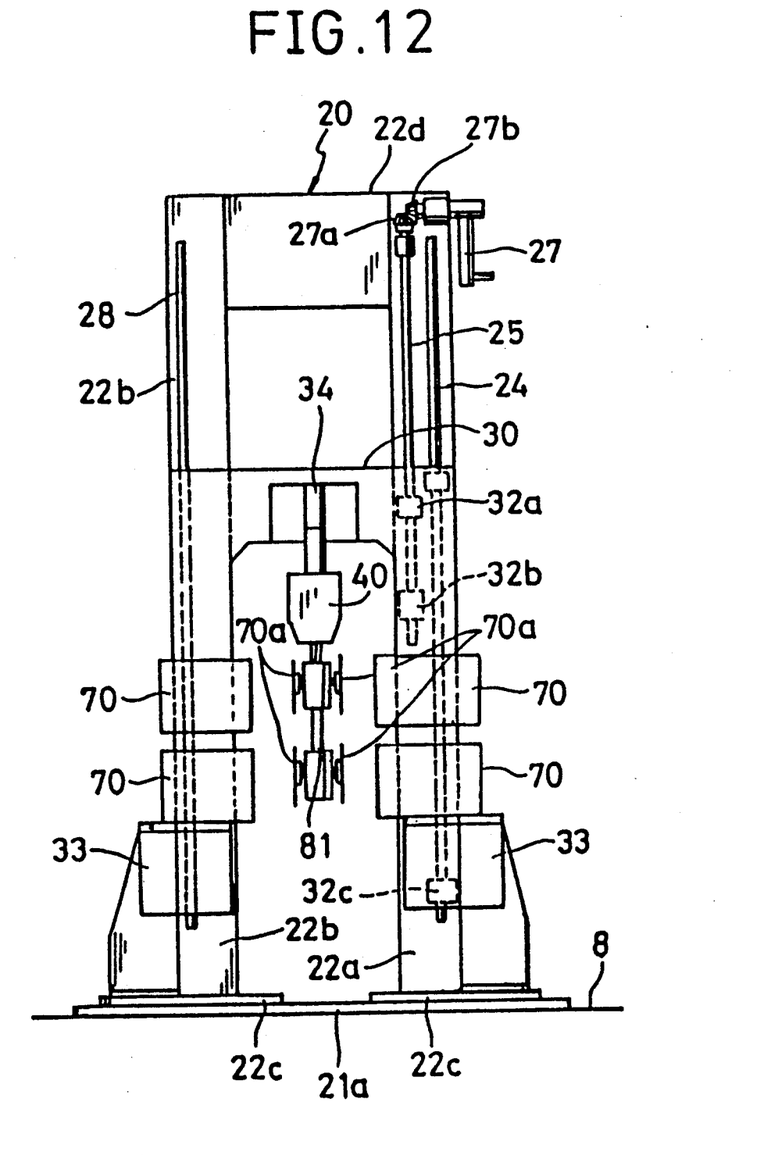
FIG. 12 is a front view showing the label feeder of FIG. 11.

FIGS. 11 and 12 show a loader of the second embodiment, in which two pairs of label magazines are provided, one pair over the other. The label feeder 20 is used with a blow mold 2 of the type which can form two moldings in a single molding operation. Under the slide holder 51, there is provided another slide holder 81 of the same arrangement. The latter slide holder 81 is associated with an air cylinder 82 and an arm mechanism 83. The second embodiment is otherwise similar to the first one, and will not be further described.

Figure 13:
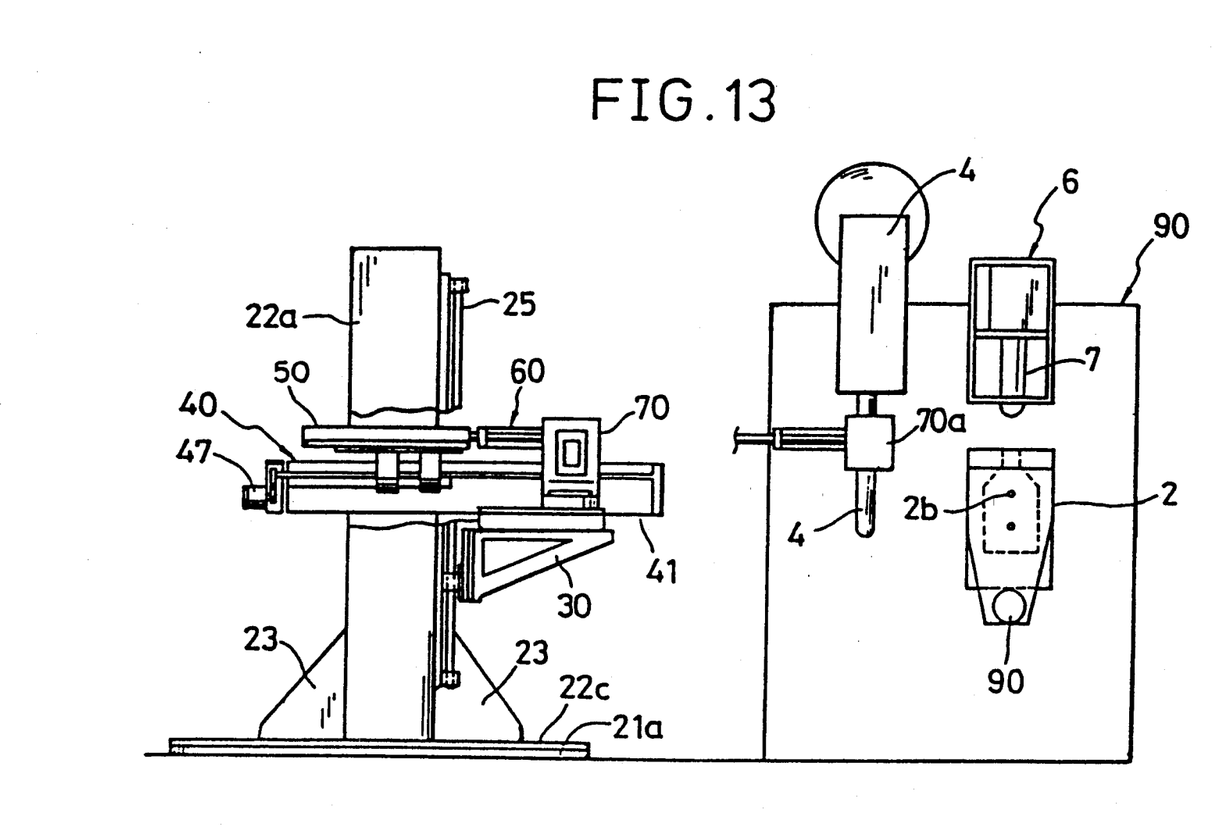
FIG. 13 is an illustration showing a third embodiment of the label feeder and a plastics molding machine.
Figure 14:
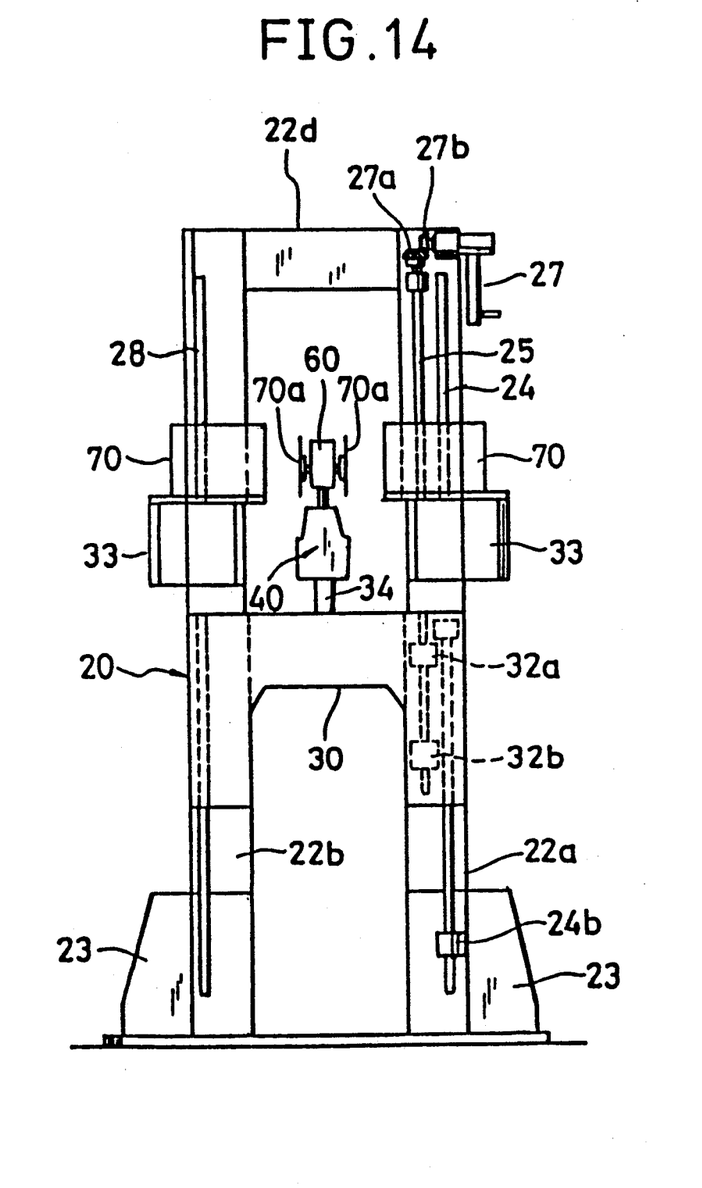
FIG. 14 is a front view showing the label feeder of FIG. 13.

FIGS. 13 and 14 show a third embodiment, in which a label feeder 90 has a loader 40 of the first embodiment arranged upside down on a base frame 30. Label magazines 70 are mounted on upper portions of the base frame 30. The loader 40 is directed toward a parison 5. The mold 2 used with this embodiment is opened and closed by a single tie bar 90. The mold 2 has ports 2b bored therethrough for drawing labels onto the mold 2 by drawing air through the ports 2b. The label feeder 90, which has a label sucking means different from those of the first and second embodiments, is arranged to attach labels 70a to the sides of a parison 5 extruded from the extruder 4 and having a volume sufficient to form a molding.

Specifically, the parts of the mold 2 is placed on both sides of the parison 5 being extruded. The labels 70a are fed between the parison 5 and the mold parts, and are drawn onto the inside of the mold 2. The parts of the mold 2 are moved toward the parison 5 and are closed together after the labels 70a have been attached to the parison 5. After the mold 2 has been closed, it is moved to a place under an air nozzle 7 for feeding compressed air into the parison 5 contained within the mold cavity. The parison 5 is thereby inflated within the cavity of the mold 2, forming a molding with the labels 70a attached thereto. After the mold 2 has been closed, extrusion of another parison 5 by the extruder 4 is not initiated until the mold 2 is again opened and the molding falls from the mold 2.

In this embodiment, labels 70a can be attached to the surface of a molding irrespective of the position of the tie bar associated with the mold 2. In addition, a molding takeoff device (not shown) may be provided under the air nozzle 7 for taking off moldings without injuring them.

The label feeder for use with a mold for plastics and the method of molding plastics, in accordance with the present invention, make it possible to attach relatively large labels to the surface of a molding by attaching them to cavity defining walls of a mold of the type which is opened and closed along a pair of tie bars. In addition, it is made possible to feed labels when molds of different heights are used. It is also made possible to change the region of label attachment and the posture of the label when it is attached.

What is claimed is:

1. A label feeder for attaching labels to at least one cavity surface of a mold used with a plastic molding machine, said label feeder comprising:

a base frame located laterally to the plastic molding machine;

first adjustment means on said base frame for vertically adjusting said frame in relation to the plastic molding machine;

at least one label magazine mounted on the base frame adapted for storing therein a pile of labels to be attached to the at least one cavity surface of the mold on said molding machine, said magazine permitting removal of a predetermined number of labels from the pile of labels;

a loader mounted on said base frame, said loader having a longitudinal profile extending toward said plastic molding machine;

second adjustment means, cooperating with said loader and said base frame, for adjusting an inclination of the axis of said longitudinal profile of said loader in relation to the mold on said molding machine;

an arm mechanism attached to said loader, said arm mechanism comprising label sucking means for consecutively sucking a label from said label magazine and attaching the label to the at least one cavity surface of the mold;

an expansion means for consecutively moving the arm mechanism toward the at least one cavity surface of the mold after said label sucking means has sucked a label from said label magazine and toward the label magazine after said label sucking means has attached the label to the at least one cavity surface of the mold;

said expansion means being mounted on the loader so as to be movable along the longitudinal profile of the loader; and a linkage provided between said expansion means and said label sucking means for maintaining said label sucked on said label sucking means at a constant angle when said label sucking means approaches the at least one cavity surface of the mold.

2. The label feeder as claimed in claim 1, wherein:
said expansion means comprises at a first air cylinder;
said arm mechanism comprises,
a holder attached to a front end of said first air cylinder,
a guide shaft extending from the holder in a longitudinal direction, said guide shaft having a stop plate provided at a front end of said guide shaft,
a slider block slidably guided along the guide shaft,
a first link arm pivoted at an end of said guide shaft, said first link arm having a length corresponding to a length of movement of said slide block,
a second link arm pivoted at a first end to said stop plate and rotatably connected at a second end to an intermediate portion of said first link arm and a second air cylinder for moving said slider block toward and away from said holder;
said linkage being a parallel linkage consisting of said first link arm, said slider block, a third link arm rotatably pivoted at a first end to said slider block and having a length corresponding to said first link arm, and a fourth link arm pivoted an end to a second end of said third link arm;
said linkage being arranged such that the labels sucked on said label sucking means are moved in a parallel relation relative to a vertical plane when said slider block is moved;
said label sucking means being attached to said fourth link arm.

3. The label feeder as claimed in claim 1 further comprising controller means for directing:
a label taking out step in which said expansion means, said arm mechanism and said label sucking means is controlled such that, when the mold is closed, said expansion is contracted so as to position said label sucking means adjacent said label magazine, said arm mechanism being subsequently stretched so as to make said label sucking means abut against the label so that the label is drawn to said label means by drawing air through said sucking means, said arm mechanism being then again contracted;
a label attaching step in which, when the mold is open and said at least one cavity surface of said mold is exposed, said expansion means is stretched so as to make said label sucking means face said at least one cavity surface, said arm mechanism being then stretched so as to attach the labels carried on said label sucking means to said at least one cavity surface; and
a standby step in which, after the label has been attached to said at least one cavity surface, both said arm mechanism and said expansion means are contracted and said label sucking means is positioned adjacent said label magazine until the mold is again opened.

* * * * *

UNITED STATES PATENT AND TRADEMARK OFFICE
CERTIFICATE OF CORRECTION

PATENT NO. : 5,026,266
DATED : June 25, 1991
INVENTOR(S) : TAKASAKI et al.

It is certified that error appears in the above-identified patent and that said Letters Patent is hereby corrected as shown below:

Title page, item

[73] Assignees: Delete "Toppan Publishing C., Ltd.,", insert therefor -- Toppan Printing Co., Ltd., --

Signed and Sealed this

Thirtieth Day of March, 1993

Attest:

STEPHEN G. KUNIN

*Attesting Officer*   *Acting Commissioner of Patents and Trademarks*